Oct. 30, 1951  K. E. CANNON  2,573,399
FISH LURE
Filed May 20, 1950
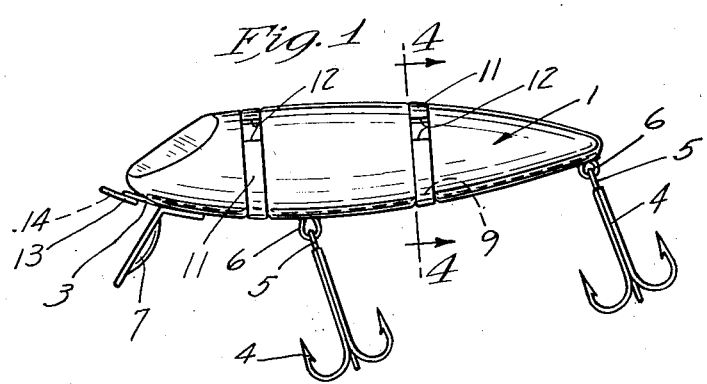
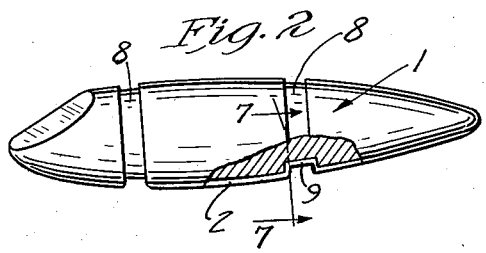
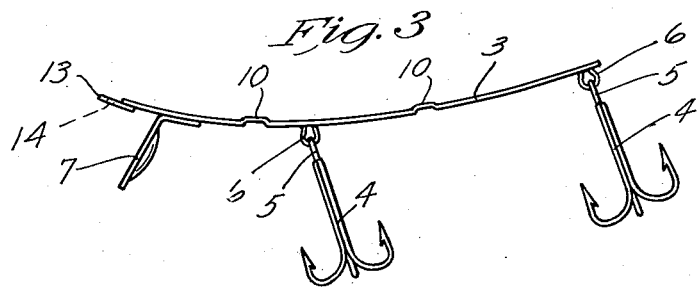
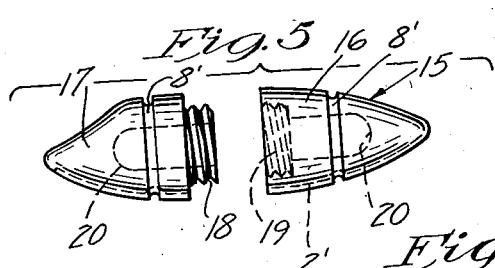
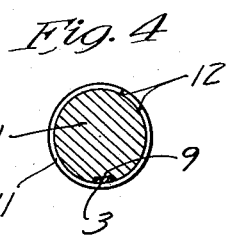
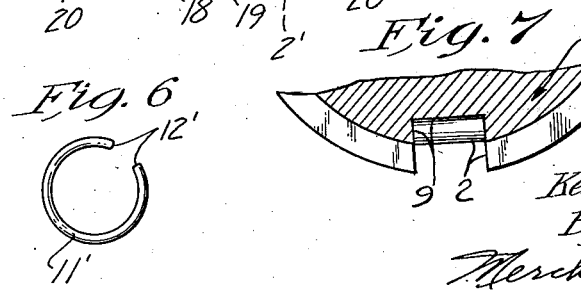
Inventor
Kenneth E. Cannon
By his Attorneys
Merchant & Merchant Patented Oct. 30, 1951

2,573,399

UNITED STATES PATENT OFFICE 2,573,399

FISH LURE

Kenneth E. Cannon, St. Paul, Minn.

Application May 20, 1950, Serial No. 163,168

5 Claims. (Cl. 43—42.36)

1

My invention relates generally to fish lures and more particularly to lures of the so-called "plug" type.

The primary object of my invention is the provision of novel means whereby a single bait hook mounting strip may be readily detachably secured to a number of structurally similar plug-type bodies. This novel arrangement of parts makes it possible to place a large number of bait bodies of different sizes, shapes and colors in a bait box or the like in close proximity to each other without fear of having the hook elements become entangled.

A still further object of my invention is the provision of novel means for releasably securing hooks to baits of the type above described.

A still further object of my invention is the provision of a multi-section bait body, which sections have screw-threaded engagement with each other, whereby a great number of varieties of shapes and colors may be arrived at with a minimum of sections.

The above and still further objects of my invention will become apparent from the following detailed specification, appended claims and attached drawings.

Referring to the drawings wherein like characters indicate like parts throughout the several views:

Fig. 1 is a side elevation of my novel bait;

Fig. 2 is a view corresponding to Fig. 1, with the hook mounting strip removed therefrom;

Fig. 3 is a view in side elevation of the hook mounting strip removed from the body of Fig. 2;

Fig. 4 is a sectional view taken on the line 4—4 of Fig. 1;

Fig. 5 is a view in side elevation of a modified form of my invention, showing a multi-section body, said sections being spaced from each other;

Fig. 6 is a view in side elevation of a lock ring utilized in conjunction with the structure of Fig. 5; and Fig. 7 is an enlarged fragmentary section taken substantially on the line 7—7 of Fig. 2.

Referring to the drawings and particularly to Figs. 1 to 4, inclusive thereof, the numeral 1 indicates in its entirety an elongated bait body having a generally circular cross-section. On its bottom surface, the bait 1 is provided with a channel 2, which extends longitudinally thereof from end to end. Snugly receivable within said channel 2 is an elongated hook-mounting strip 3 having hook elements 4, the looped upper ends 5 of which are received within longitudinally-

2 spaced eyes 6 on the undersurface of the strip 3, whereby to mount the hook elements 4 for free swinging movements. Adjacent its forward end, the strip 3 is provided with a depending spoon 7, commonly found on baits of this type. Intermediate its ends, the body 1 is likewise formed to provide a pair of longitudinally-spaced annular grooves 8, which intersect the channel 2 at substantially right angles. It will be noted that said channel 2, at its points of intersection with the grooves 8 is recessed radially inwardly with respect to the bottom of the grooves 8, as indicated by the numerals 9 in Fig. 4. It will likewise be observed, by reference to Fig. 3, that the strip 3 is provided with offset portions 10, which extend upwardly into the recesses 9 when the mounting strip 3 is properly positioned within the channel 2.

Split segmental lock rings 11 are snugly mounted one each within said grooves 8, whereby to permit manual rotation thereof. It will be observed that the distance between the spaced ends 12 of the lock rings 11 is greater than the transverse width of the mounting strips 3 (see Fig. 4), whereby to permit passage therebetween of said mounting strip 3. It will likewise be observed that the lock rings 11 are adapted to embrace the mounting strip 3 when the lock rings are rotated in the manner suggested by Fig. 4. Under such conditions, the seating of the offset portions 10 of the recesses 9 positively locks the strip 3 against longitudinal movements, whereas the sides of the channel 2 prevent transverse movement of strip 3.

It will be noted that when the mounting strip 3 is releasably locked within the channel 2, as indicated in Fig. 1, that one of the hook elements 4 is situated intermediate the lock rings 11, whereas one thereof is closely adjacent the rear end of the body 1. The fish line (not shown) is adapted to be secured to the forwardly-projecting lip 13 through an opening 14 therein. By this arrangement it will be seen that all force exerted on the hook elements 4 is transmitted directly to the line through the medium of the strip 3, no stress of any nature being exerted directly upon the body 1.

In the modified form of my invention illustrated in Figs. 5 and 6, the body 15 is made up of a plurality of mating sections 16 and 17, one of which is provided with the reduced axially extended screw-threaded portion 18, and the other of which is provided with the screw-threaded recess 19. Each of the sections 16 and 17 is provided with mating cavities 20 into which weights of different sizes may be inserted to vary the level of the bait as it drops into the water. The concept of a body made of mating sections gives the fisherman a large variety of baits differing in shape, size and color, with but a minimum of sections.

All other portions of the structures of Figs. 5 and 6 are identical with those of Figs. 1 to 4, inclusive, and bear identical numbers with prime marks added.

While in the above specification I have described one embodiment which my invention may assume in practice, it will, of course, be understood that the same is capable of modification and that modification may be made without departing from the spirit and scope of the invention as expressed in the following claims.

What I claim is:

1. A fish lure comprising a plug-like body, said body being provided with a longitudinally-extended channel, a hook mounting strip snugly receivable within said channel, said body further being provided with an annular groove which intersects said channel, and a split lock ring snugly mounted in said groove, said lock ring adapted to receive said mounting strip between its spaced ends and adapted to embrace said mounting strip when said mounting strip is received within said channel and rotary motion is imparted to said lock ring.

2. A fish lure comprising an elongated plug-like body having a longitudinally-extended channel on its underside, an elongated hook-mounting strip snugly receivable within said channel, said body being provided intermediate its ends with an annular groove which intersects said channel at substantially right angles, and a split segmental lock ring snugly receivable within said groove, said lock ring adapted to receive said mounting strip between its spaced ends and adapted to frictionally embrace said mounting strip when said mounting strip is received within said channel and rotary motion is imparted to said lock ring.

3. The structure defined in claim 2 in further combination with means positively limiting longitudinal movement of said mounting strip in said channel.

4. A fish lure comprising a cross-sectionally circular plug-like body provided on its underside with a longitudinally extended channel, a hook mounting strip having spaced offset portions intermediate its ends snugly receivable within said channel, said body further being provided with a plurality of longitudinally-spaced annular grooves which intersect said channel at substantially right angles, and a split segmental lock ring snugly mounted in each of said grooves, said lock rings adapted to receive said mounting strip between their spaced ends and embrace said mounting strip when said mounting strip is snugly received within said channel and the rotary motion imparted to said lock rings.

5. The structure defined in claim 4 in which said channel at the point of intersection with said grooves is recessed radially inwardly with respect to the bottom of said grooves providing recesses, the offset portions of said hook-mounting strips being receivable within said recesses, whereby to positively lock said mounting strip against longitudinal movements with respect to said body when said lock rings are moved to embrace said mounting strips.

KENNETH E. CANNON.

REFERENCES CITED

The following references are of record in the file of this patent:

UNITED STATES PATENTS

| Number | Name | Date |
|---|---|---|
| 1,981,091 | Clark | Nov. 20, 1934 |
| 2,112,385 | Smith | Mar. 29, 1938 |